United States Patent [19]

Maroney

[11] Patent Number: 5,573,336
[45] Date of Patent: Nov. 12, 1996

[54] SEAL FOR A SPHERICAL PLAIN BEARING

[75] Inventor: Michael E. Maroney, Anderson, S.C.

[73] Assignee: The Torrington Company, Torrington, Conn.

[21] Appl. No.: 521,769

[22] Filed: Aug. 31, 1995

[51] Int. Cl.$^6$ .................................................. F16J 15/32
[52] U.S. Cl. .......................... 384/146; 777/100; 777/152; 777/37; 777/205
[58] Field of Search .................................... 277/134, 169, 277/100, 152, 37, 205; 384/145, 146, 484

[56] References Cited

U.S. PATENT DOCUMENTS

| | | | |
|---|---|---|---|
| 2,631,906 | 3/1953 | Brock | 277/205 |
| 2,635,907 | 4/1953 | Heimbuch | 277/205 |
| 2,743,950 | 5/1956 | Helfrecht et al. | 277/134 |
| 3,497,225 | 2/1970 | Workman | 277/134 |
| 3,588,201 | 6/1971 | Schmidt | 384/146 |
| 3,589,739 | 6/1971 | Scholten | 277/134 |
| 3,848,938 | 11/1974 | Stella et al. | 384/146 |
| 3,873,166 | 3/1975 | Berg et al. | 384/146 |
| 4,522,411 | 6/1985 | Burgan . | |
| 4,531,747 | 6/1985 | Miura . | |
| 4,836,694 | 6/1989 | Schmehr et al. . | |
| 4,838,402 | 6/1989 | Feser . | |
| 5,125,672 | 6/1992 | Wycliffe | 277/152 |
| 5,385,352 | 1/1995 | Kurose . | |

FOREIGN PATENT DOCUMENTS

| | | | |
|---|---|---|---|
| 209271 | 9/1987 | Japan | 277/152 |
| 231067 | 9/1988 | Japan | 277/152 |
| 2066288 | 7/1981 | United Kingdom | 277/152 |

*Primary Examiner*—Scott Cummings
*Attorney, Agent, or Firm*—John C. Bigler

[57] ABSTRACT

An annular metallic support member has a cylindrical surface mountable within a bore of the spherical plain bearing outer ring or bearing housing such that a conical surface of the metallic support member overlies the spherical member. An annular elastomeric seal lip is mounted on the conical surface of the metallic support member, and an elastomeric seal body is mounted on the conical surface of the metallic support member, axially inward of the elastomeric seal lip, such that the elastomeric seal lip and elastomeric seal body contact the spherical member. The elastomeric seal body may have grooves for supplying lubricant to the elastomeric seal lip.

18 Claims, 1 Drawing Sheet

SEAL FOR A SPHERICAL PLAIN BEARING

BACKGROUND OF THE INVENTION

This invention relates generally to bearing seals and, more particularly, to a seal adapted for use with a spherical plain bearing.

Spherical plain bearings, sometimes referred to as ball and socket joints, are used in gimbal mechanisms, track drives for bulldozers, supports for backhoe shovels, and other articulating mechanisms. In such applications, effective seals may extend the life of the ball (or spherical member) and socket (outer ring or bearing housing) by retaining lubricant within the bearings, excluding debris from the bearings, and reducing rust on the spherical member and outer ring.

Various sealing rings have been proposed for spherical plain bearings such as, for example, a simple elastomeric wiper ring mounted on the outer ring at the juncture with the spherical member. However, such sealing rings provide little space for lubricant retention, are not biased in a direction normal to the spherical member's surface, allow little misalignment of the spherical member, and may require a separate protective metal cap over the sealing ring.

The foregoing illustrates limitations known to exist in present seals for spherical plain bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a seal for a spherical plain bearing having a spherical member and an outer ring or bearing housing. The seal comprises an annular metallic support member having a cylindrical surface and a conical surface. An annular elastomeric seal lip is mounted on the conical surface of the metallic support member, and an elastomeric seal body is mounted on the conical surface of the metallic support member, axially inward of the elastomeric seal lip. The cylindrical surface is mountable within a bore of the outer ring or bearing housing such that the elastomeric seal lip and elastomeric seal body contact the spherical member.

In another aspect of the present invention, this is accomplished by providing a seal for a spherical plain bearing having a spherical member and an outer ring or bearing housing. The seal comprises an annular elastomeric seal lip, an elastomeric seal body located axially inward of the elastomeric seal lip, lubricating means for providing regulated flow of lubricant through the elastomeric seal body, and mounting means for mounting the elastomeric seal lip and the elastomeric seal body on the outer ring or bearing housing such that the elastomeric seal lip and the elastomeric seal body are in contact with the spherical member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
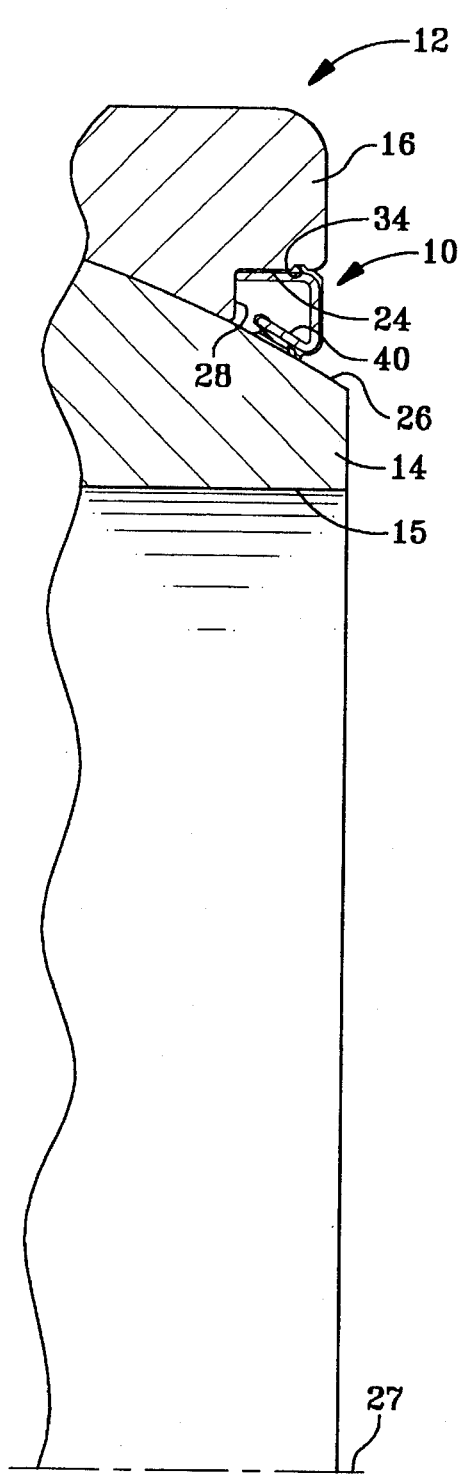
FIG. 1 is a cross-sectional view illustrating a portion of a spherical plain bearing and an embodiment of the seal for a spherical plain bearing of the present invention.

Referring now to the drawings, FIG. 1 shows seal 10 of the present invention as mounted in spherical plain bearing 12. Spherical plain bearing 12 comprises spherical member 14 and outer ring or bearing housing 16. It should be noted that the spherically concave socket for spherical member 14 may be provided in an outer ring that is held within a bearing housing or in the bearing housing itself, without an outer ring, as is common in some forms of ball and socket joints. As illustrated, spherical plain bearing 12 may include central bore 15, centered with respect to spherical member 14, to facilitate mounting of spherical member 14 on a shaft.

Figure 2:
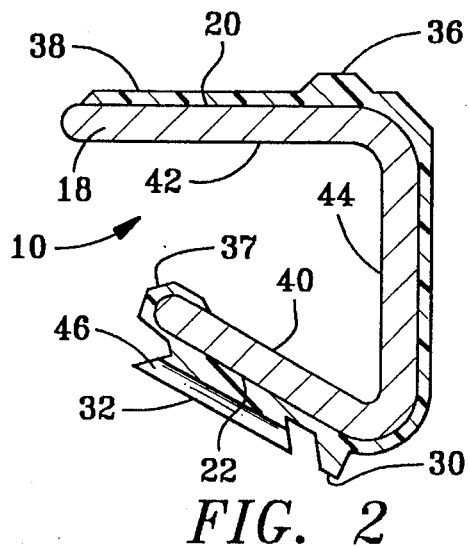
FIG. 2 is an enlarged cross-sectional view of the seal for a spherical plain bearing of FIG. 1, prior to installation in the spherical plain bearing.

As best shown in FIG. 2, seal 10 comprises annular metallic support member 18, having cylindrical surface 20 and conical surface 22, and elastomeric seal members, described below. Cylindrical surface 20 is mounted within bore 24 of outer ring or bearing housing 16 such that conical surface 22 overlies and is substantially tangent to spherical surface 26 of spherical member 14. Seal 10 has been installed axially, with respect to axis 27 of bore 24, to bottom surface 28 of bore 24.

Annular elastomeric seal lip 30 is mounted on conical surface 22 of the metallic support member such that elastomeric seal lip 30 contacts spherical surface 26 of spherical member 14 when metallic support member 18 is mounted within bore 24. Elastomeric seal body 32 is also mounted on conical surface 22 of metallic support member 18 in contact with spherical surface 26. Elastomeric seal body 32 is separated from and, with respect to axis 27 of bore 24, axially inward of elastomeric seal lip 30.

In this embodiment, seal 10 is retained within bore 24 by engagement of annular groove 34 within bore 24 by elastomeric annular ridge 36, mounted on cylindrical surface 20 of annular metallic support member 18. Elastomeric seal lip 30, elastomeric seal body 32 and elastomeric annular ridge 36 are formed over annular metallic support member in a single molding operation such that the elastomeric coating connects those elements and forms edge portion 37, improving bonding. Elastomeric mounting portion 38 covers cylindrical surface 20, enhancing sealing between seal 10 and outer ring or bearing housing 16. Alternatively, elastomeric mounting portion 38 may be omitted and surface 20 may form a press fit with bore 24, or other retention means may be provided.

Annular metallic support member 18, in cross section, forms portions of a right triangle: hypotenuse portion 40 overlying spherical member 14 and including conical surface 22, first side portion 42 extending axially with respect to bore 24 and including cylindrical surface 20, and second side portion 44 extending radially with respect to bore 24 and perpendicular to first side portion 42. This configuration can be manufactured efficiently from sheet steel or other metal of uniform thickness by pressing operations.

During installation, hypotenuse portion 40 and second side portion 44 are resiliently deformed by spherical member 14 such that elastomeric seal lip 30 and elastomeric seal body 32 are compressed and biased, both radially and axially, against spherical surface 26 to effect sealing. Ideally, this biasing force is directed normal to spherical surface 26. Annular metallic support member 18 may be formed of a mild carbon steel, or of a similar material suitable for springs, and may be heat treated to enhance its resiliency.

Elastomeric seal body 32 extends more than half the length of hypotenuse portion 40 and thus provides a wide surface area in contact with spherical surface 26. As a result, seal 10 permits a large amount of misalignment of a shaft mounted in central bore 15. Grooves 46 within elastomeric seal body 32 extend along spherical surface to lubricate the interface between spherical surface 26 and elastomeric seal body 32 and to provide a regulated flow of lubricant through the elastomeric seal body 32 to elastomeric seal lip 30. Grooves 46 may be simple rounded or square channels extending axially outwardly and radially inwardly with respect to bore 24, as shown, and may be located at four locations, for example, distributed equidistantly along the circumference of seal 10. Alternatively, apertures or channels of other configurations and arrangements may be used.

As shown in FIG. 1, hypotenuse portion 40 does not extend to bottom surface 28, thus allowing the space between hypotenuse portion 40, first side portion 42 and second side portion 44 to serve as a reservoir for grease or other lubricant. This space also provides a useful receptacle for debris and other contaminants that could otherwise get between spherical surface 26 and outer ring or bearing housing 16, causing abrasion or other damage. Second side portion 44 protects seal 10 and eliminates any need for a separate metal bearing cap.

Figure 3:
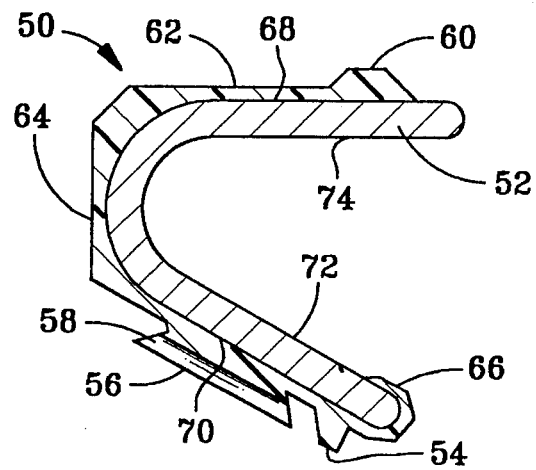
FIG. 3 is an enlarged cross-sectional view of a second embodiment of the seal for a spherical plain bearing of the present invention prior to installation in the spherical plain bearing.

FIG. 3 illustrates a second embodiment of the present invention indicated as seal 50. Seal 50 comprises annular metallic support member 52, having cylindrical surface 20 and conical surface 22, elastomeric seal lip 54, elastomeric seal body 56 with grooves 58, and elastomeric annular ridge 60, similar to corresponding elements of seal 10. The elastomeric material may be molded over annular metallic support member 52 in a contiguous form including mounting portion 62, end portion 64, and edge portion 66 to enhance sealing and bonding in the manner described above, with respect to the first embodiment.

Annular metallic support member 52 has cylindrical surface 68 conical surface 70, hypotenuse portion 72, and first side portion 74, similar to corresponding elements of annular metallic support member 18. In cross section, annular metallic support member 52 is V-shaped. Alternatively, its cross section may be considered to be a right triangle with the second side portion open. During installation, hypotenuse portion 72 is resiliently deflected away from the spherical member to provide a substantially normal force biasing elastomeric seal lip 54 and elastomeric seal body 56 against the spherical member to effect sealing.

Figure 4:
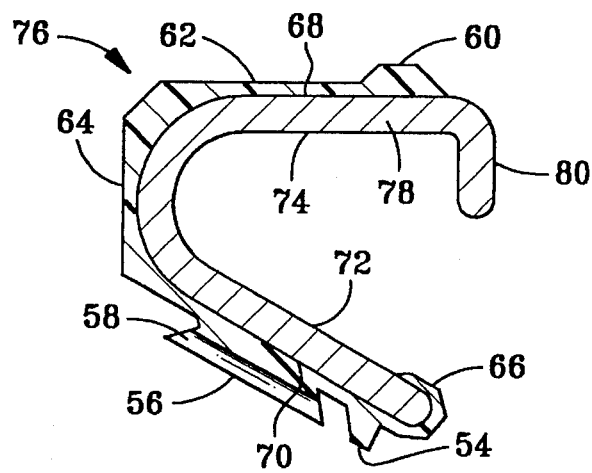
FIG. 4 is an enlarged cross-sectional view of a third embodiment of the seal for a spherical plain bearing of the present invention prior to installation in the spherical plain bearing.

FIG. 4 illustrates an embodiment of the present invention similar to seal 50 and using the same reference numerals to indicate identical elements. Seal 76 has annular metallic support member 78 that is similar to annular metallic support member 52 except for radial portion 80, partially closing the open second side of the right triangle cross section. Radial portion 80 adds rigidity to seal 76 and provides a convenient surface for pressing the seal into the bore of the spherical plain bearing during installation.

From the above description, it will be apparent that the present invention provides an improved seal for a spherical plain bearing that permits greater misalignment of the spherical member and does not require a separate protective metal bearing cap. Improved sealing results from the biasing of the elastomeric portion of the seal in a direction normal to the surface of the spherical member and from the lubrication through the wide elastomeric seal body to the narrow elastomeric seal lip. In addition, the seal may include a reservoir for lubricant retention.

Having described the invention, what is claimed is:

1. The combination of a seal and a spherical plain bearing, the combination comprising:

a spherical member;

an outer ring or bearing housing, the outer ring or bearing housing having a bore about an axis;

an annular metallic support member having a cylindrical surface and a conical surface, the cylindrical surface being mounted within the bore of the outer ring or bearing housing such that the conical surface overlies the spherical member;

an annular elastomeric seal lip mounted on the conical surface of the metallic support member such that the elastomeric seal lip contacts the spherical member; and an elastomeric seal body mounted on the conical surface of the metallic support member, axially inward of the elastomeric seal lip, such that the elastomeric seal body contacts the spherical member.

2. The combination of a seal and a spherical plain bearing according to claim 1, wherein the metallic support member is formed of sheet metal of substantially uniform thickness.

3. The combination of a seal and a spherical plain bearing according to claim 1, wherein the metallic support member is resilient such that the elastomeric seal lip and the elastomeric seal body are biased, axially and radially, against the spherical member when the metallic support member is mounted within the bore of the outer ring or bearing housing.

4. The combination of a seal and a spherical plain bearing according to claim 1, further comprising elastomeric mounting means on the metallic support member for mounting the seal within the bore of the outer ring or bearing housing.

5. The combination of a seal and a spherical plain bearing according to claim 4, wherein the elastomeric mounting means includes an annular ridge for engaging an annular groove in the bore of the outer ring or bearing housing.

6. The combination of a seal and a spherical plain bearing according to claim 1, further comprising lubricating means for providing a regulated flow of lubricant through the elastomeric seal body to the elastomeric seal lip.

7. The combination of a seal and a spherical plain bearing according to claim 6, wherein the lubricating means comprises at least one groove through the elastomeric seal body.

8. The combination of a seal and a spherical plain bearing according to claim 1, wherein the metallic support member forms a lubricant reservoir having a triangular cross section.

9. A seal for a spherical plain bearing having a spherical member and an outer ring or bearing housing, the outer ring or bearing housing having a bore about an axis, the seal comprising:

an annular metallic support member having a cylindrical surface and a conical surface, the cylindrical surface being mountable within the bore of the outer ring or bearing housing such that the conical surface overlies the spherical member;

an annular elastomeric seal lip mounted on the conical surface of the metallic support member such that the elastomeric seal lip contacts the spherical member when the metallic support member is mounted within the bore of the outer ring or bearing housing; and an elastomeric seal body mounted on the conical surface of the metallic support member, axially inward of the elastomeric seal lip, such that the elastomeric seal body contacts the spherical member when the metallic support member is mounted within the bore of the outer ring or bearing housing;

wherein the metallic support member, in cross section, forms portions of a right triangle, a hypotenuse portion configured to overly the spherical member and including the conical surface, and a first side portion of the right triangle extending axially and including the cylindrical surface.

10. The seal for a spherical plain bearing according to claim 9, wherein the metallic support member also forms at least part of a second side portion of the right triangle extending radially and perpendicular to the first side portion of the right triangle.

11. A seal for a spherical plain bearing having a spherical member and an outer ring or bearing housing, the outer ring or bearing housing having a bore about an axis, the seal comprising:

an annular metallic support member having a cylindrical surface and a conical surface, the cylindrical surface being mountable within the bore of the outer ring or bearing housing such that the conical surface overlies the spherical member;

an annular elastomeric seal lid mounted on the conical surface of the metallic support member such that the elastomeric seal lip contacts the spherical member when the metallic support member is mounted within the bore of the outer ring or bearing housing; and an elastomeric seal body mounted on the conical surface of the metallic support member, axially inward of the elastomeric seal lip, such that the elastomeric seal body contacts the spherical member when the metallic support member is mounted within the bore of the outer ring or bearing housing;

wherein the metallic support member comprises a cylindrical portion including the cylindrical surface and a conical portion including the conical surface, the cylindrical portion and the conical portion being contiguous and formed of sheet metal of uniform thickness bent into a V-shape in cross section.

12. The combination of a seal and a spherical plain bearing, the combination comprising:

a spherical member;

an outer ring or bearing housing, the outer ring or bearing housing having a bore about an axis;

an annular elastomeric seal lip;

an elastomeric seal body located axially inward of the elastomeric seal lip;

lubricating means for providing regulated flow of lubricant through the elastomeric seal body; and mounting means for mounting the elastomeric seal lip and the elastomeric seal body within the bore of the outer ring or bearing housing and in contact with the spherical member.

13. The combination of a seal and a spherical plain bearing according to claim 12, wherein the lubricating means comprises apertures extending through the elastomeric seal body.

14. The combination of a seal and a spherical plain bearing according to claim 12, wherein the lubricating means comprises grooves in the elastomeric seal body extending along the surface of the spherical member.

15. The combination of a seal and a spherical plain bearing according to claim 12, wherein the mounting means comprises a metallic support member.

16. The combination of a seal and a spherical plain bearing according to claim 12, wherein the mounting means comprises a resilient support member biasing, radially and axially, the elastomeric seal lip and the elastomeric seal body against the spherical member.

17. The combination of a seal and a spherical plain bearing according to claim 16, wherein the resilient support member is made of heat treated steel.

18. The combination of a seal and a spherical plain bearing according to claim 12, further comprising reservoir means in communication with the lubricating means for providing a reservoir of lubricant to be supplied through the elastomeric seal body.

* * * * *